(12) United States Patent
Manion et al.

(10) Patent No.: US 7,430,747 B2
(45) Date of Patent: Sep. 30, 2008

(54) PEER-TO PEER GRAPHING INTERFACES AND METHODS

(75) Inventors: Todd R. Manion, Redmond, WA (US); Jeremy L. Dewey, Redmond, WA (US); Robert D. Donner, Sammamish, WA (US); Scott A. Senkeresty, Duvall, WA (US); Rohit Gupta, Redmond, WA (US); Upshur Warren Parks, III, Bothell, WA (US); Noel W. Anderson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 10/309,865

(22) Filed: Dec. 4, 2002

(65) Prior Publication Data

US 2004/0111469 A1  Jun. 10, 2004

(51) Int. Cl.
 G06F 3/00  (2006.01)
 G06F 9/44  (2006.01)
 G06F 9/46  (2006.01)
 G06F 13/00  (2006.01)
(52) U.S. Cl. .................... 719/328; 709/223
(58) Field of Classification Search .......... 709/228, 709/248, 223; 719/328
 See application file for complete search history.

(56) References Cited

U.S. PATENT DOCUMENTS 5,987,376 A  11/1999  Olson et al.
6,920,455 B1*  7/2005  Weschler ............... 707/100
7,159,223 B1*  1/2007  Comeau ................. 719/310
2002/0143989 A1  10/2002  Huitema et al.
2003/0055892 A1  3/2003  Huitema et al.
2003/0056093 A1  3/2003  Huitema et al.
2003/0056094 A1  3/2003  Huitema et al.
2004/0111515 A1  6/2004  Manion et al.

OTHER PUBLICATIONS

Bolcher et al., "Peer-to-Peer Architectures and the Magi™ Open-Source Infrastructure," Endeavors Technology, Inc., Dec. 6, 2000.*
Reynolds, J. "BOOTP Vendor Information Extensions," Network Working Group, http://www.faqs.org/rfc/rfc1395.txt, retrieved Dec. 23, 2005, Jan. 1993.*

(Continued)

*Primary Examiner*—Meng-Ai An
*Assistant Examiner*—Nathan Price
(74) *Attorney, Agent, or Firm*—Marshall, Gerstein & Borun LLP

(57) ABSTRACT

Application programming interfaces and methods that provide graph management in a peer-to-peer (P2P) network are provided. More specifically, new and improved P2P application programming interfaces (APIs) and methods for the creation and access of graphs, the retrieval of node and graph information, the addition, modification, deletion and management of records (data), the importation and exportation of graph data, the direct communication between graph nodes, the addition of a security provider to a graph, the setting and retrieval of presence information, the registering for event notifications, and other utility and support functions are presented. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

10 Claims, 2 Drawing Sheets

OTHER PUBLICATIONS

Baskin, Cathryn. "AOL vs. Microsoft vs. All of Us," PC World; Oct. 1999; 17, 10; Proquest Computing, p. 19.*

"Project JXTA: Technical Shell Overview." Sun Microsystems, Inc., Apr. 25, 2001; retrieved from <http://www.jxta.org/project/www/docs/TechShellOverview.pdf> on Aug. 10, 2006.*

"Project JXTA: Technical Specification." Version 1.0, Sun Microsystems, Inc, Apr. 25, 2001; retrieved from <http://download.jxta.org/files/documents/27/12/JXTA-Spec.pdf> on Aug. 10, 2006.*

Gong, Li. "Project JXTA: A Technology Overview." Sun Microsystems, Inc., Apr. 25, 2001; retrieved from <http://downloaded.jxta.org/files/documents/27/35/JXTA-Tech-Overview.PDF> on Aug. 10, 2006.*

Tanenbaum, Andrew S. "Computer Networks," Third Edition, Prentice Hall PTR, 1996; pp. 437-449.*

"Microsoft Computer Dictionary," Fifth Edition, Microsoft Press, 2002; pp. 31, 238-239, 424, 467.*

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *Past: A large-scale, persistent peer-to-peer storage utility*, at Rice University and Microsoft Research, 6 pages.

Rowstron, Antony, and Peter Druschel, *Storage management and caching in Past, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *Scribe: The design of a large-scale event notification infrastructure*, at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord.

Ellison, C., *SPKI Requirements*, (The Internet Society 1999), at http://www.ieft.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

"Products: Groove Virtual Office FAQ ", *Groove Networks*, retrieved from http://www.groove.net/index.cfm?pagename=VO_FAQ on May 31, 2005 (5 pages).

"Products: Groove Virtual Office", *Groove Networks*, retrieved from http://www.groove.net/index/cfm/pagename/VirtualOffice on May 31, 2005 (2 pages).

"Products: Why Groove", *Groove Networks*, retrieved from http://www.www.groove.net/index.cfm?pagename=Products_Overview on May 31, 2005 (2 pages).

"Microsoft, Groove Networks to Combine Forces to Create Anytime, Anywhere Collaboration", *Microsoft Presspass-Information for Journalists*, retrieved from http://www.microsoft.com/prespass/features/2005/mar05/03-10GrooveQA.asp on May 31, 2005 (9 pages).

Gong, Li et al., "Project JXTA: A Technology Overview", *Sun Microsystems, Inc.*Oct. 29, 2002, (pp. 1-11).

Newmarch, Jan, "JXTA, Overview", Oct. 7, 2002, retrieved from http://jan.netcomp.monash.edu.au/distjava/jxta.html on Jun. 2, 2005 (pp. 1-15).

"News: Sun Incorporating JXTA into Products", java.net *Th Source for Java Technology Collaboration*, Jan. 30, 2004, retrieved from http://today.java.net.pub/n/SunKXTA on Jun. 2, 2005 (1 page).

Traversat, Bernard, et al., "Project JXTA Virtual Network", *Sun Microsystems, Inc.* Oct. 28, 2002 (pp. 1-10).

"Project JXTA: An Open, Innovative Collaboration", *Sun Microsystems, Inc.* Apr. 25, 2001, (pp. 1-5).

* cited by examiner

PEER-TO PEER GRAPHING INTERFACES AND METHODS

FIELD OF THE INVENTION

The present invention relates generally to graph and data record management in a peer-to-peer infrastructure, and more particularly to application programming interfaces and methods for the creation and maintenance of peer-to-peer graphs, and management of records (data) and node communication in a peer-to-peer graph.

BACKGROUND OF THE INVENTION

Various communication technologies on the Internet allow users with common interest to collaborate, share files, chat with one another, multi-cast audio and video for presentations and group meetings, and engage in multi-player gaming. Currently, however, most communication on the Internet takes place in a server centric environment whereby all communication flows to or through large central servers to which individuals may connect to join and participate in such communication.

With the reemergence of peer-to-peer technology, the current server centric model of Internet communication is quickly being replaced. Indeed, peer-to-peer technologies enable users to contact one another in a serverless environment, free from the constraints of server based Internet communication. In a peer-to-peer based system, a users anonymity and privacy may be maintained since communication occurs directly between peers within the network. However, while individual communication and file sharing is relatively well established in peer-to-peer networks, establishing, discovering, joining, maintaining, and sharing information in a peer-to-peer environment is not well established.

Peer-to-peer communication, and in fact all types of communication, depend on the possibility of establishing valid connections between selected entities or nodes. These entities or nodes may be peers (e.g., users or machines) or groups formed within a peer-to-peer network. The connections between the nodes form the peer-to-peer graph that enables communication and information to be passed to and between the nodes. However, entities may have one or several addresses that may vary because the entities move in the network, because the topology changes, because an address lease cannot be renewed, because the group function or purpose has changed, etc. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their individual or group address(es) through various mechanisms. Some protocols also allow a client to acquire knowledge of other entities' addresses through the processing of requests from others in the network. Indeed, it is this acquisition of address knowledge that enables successful operation of these peer-to-peer networks by maintaining a robust graph. That is, the better the information about other peers and groups in the network (i.e. the more robust the graph), the greater the likelihood that a search for a particular resource or record will converge.

As with a server centric environment, the peer-to-peer graphs may be entirely open to allow Internet file searching and sharing within the graph. However, because peer-to-peer networks are formed as a graph of distributed users or peers, it is necessary that communication and data (records) be passed from one peer to another before all peers within a network may become cognizant of the shared information. Systems that provide such routing include Usenet and OSPF. However, such current systems suffer from limitations that have, to date, limited the full development of peer-to-peer technology. Additionally, peer-to-peer networks currently suffer from a lack of adequate graph management that, at times allows the graphs to "break" or become split when one of the members leaves the group. In such an instance, information from one part of the graph may no longer be passed to peer members on the other side of the partition created by the departure of one of the peers. As a further disadvantage, no adequate mechanism exists for the detection of such partition.

There exists, therefore, a need in the art for peer-to-peer graph and record management interfaces that addresses the above-described and other problems existing in the art.

BRIEF SUMMARY OF THE INVENTION

The inventive concepts disclosed in this application involve a new and improved system and method for graph management in a peer-to-peer (P2P) network. More specifically, the present invention is directed to a new and improved P2P application programming interfaces (APIs) and methods for the creation and access of graphs, the retrieval of node and graph information, the addition, modification, deletion and management of records (data), the importation and exportation of graph data, the direct communication between graph nodes, the addition of a security provider to a graph, the setting and retrieval of presence information, the registering for event notifications, and other utility and support functions.

In one embodiment of the present invention, an API and method are exposed to the application writers in order to establish peer-to-peer graphs and to efficiently and reliably pass data between peers. The graphing infrastructure ensures that each node has a consistent view of the data in the graph. The core piece of the graphing technology is the graph node. A node represents a particular instance of an individual on the network. Nodes are able to connect to each other and form a network of nodes or a graph. Nodes are able to send data between each other in the form of records.

Records are essentially pieces of data flooded (sent) to all nodes in a graph. Once a record has been received by a node, the node places the record in a database or data store. Graphing is responsible for ensuring each Node's database has the exact same view of the data. It keeps each node synchronized. As Nodes connect and disconnect from Graphs, partitions or "splits" in the graph may occur. Graphing is also responsible for detecting and repairing these partitions. If it desires to do so, nodes in the graph can create connections separate from the traditional graph connections. These direct connections allow nodes to send arbitrary data to each other. Finally, graphing has an eventing infrastructure that allows applications to register and receive event notifications. Event notifications are the mechanism graphing uses to alert applications to the fact that something has changed within the graph.

In one embodiment of the present invention, application programming interfaces (APIs) are provided that provide graph creation and access management. These APIs create a new graph, open an existing graph for connection, open a specific port listening for connections, initiate a connection to a listening port at the specified IP address, allow a developer to specify the security provider for the graph, add an unsecured record to the graph, update an unsecured record in the graph, and delete an unsecured record from the graph. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

In another embodiment of the present invention, application programming interfaces (APIs) are provided that provide the retrieval and management of graph and node information. These APIs get node information, set node attributes, get graph properties, get group status, set graph properties, and convert the current graph time to the local system time. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

In a further embodiment of the present invention, application programming interfaces (APIs) are provided that provide record management. These APIs add records, update records, delete records, retrieve records, enumerate records, search for records, and validate deferred records. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

In a still further embodiment of the present invention, application programming interfaces (APIs) are provided that allow a node to export its database and import a database from another node. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

In a further embodiment of the present invention, application programming interfaces (APIs) are provided that allow a node to enumerate all nodes in a graph and that allow a node to set its presence in the graph. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

In yet a further embodiment of the present invention, application programming interfaces (APIs) are provided that provide utility and support functions. These APIs retrieve the next item in an enumeration, end an enumeration, get an item count, and free data retrieved by other APIs. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

In a still further embodiment of the present invention, application programming interfaces (APIs) are provided that allow for direct communication between peers. These APIs open direct communications, close direct communications, send data, and enumerate connections to the node. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

In a further embodiment of the present invention, application programming interfaces (APIs) are provided that provide an events infrastructure. These APIs register for event notifications, un-register events, and retrieve event data. Each of these interfaces utilize various parameters that are passed in from an application program that uses these interfaces to manage and utilize graphs. The interfaces return a value that indicates the success or failure of the function. For failures, the interfaces provide an indication as to the problem resulting in the failure.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
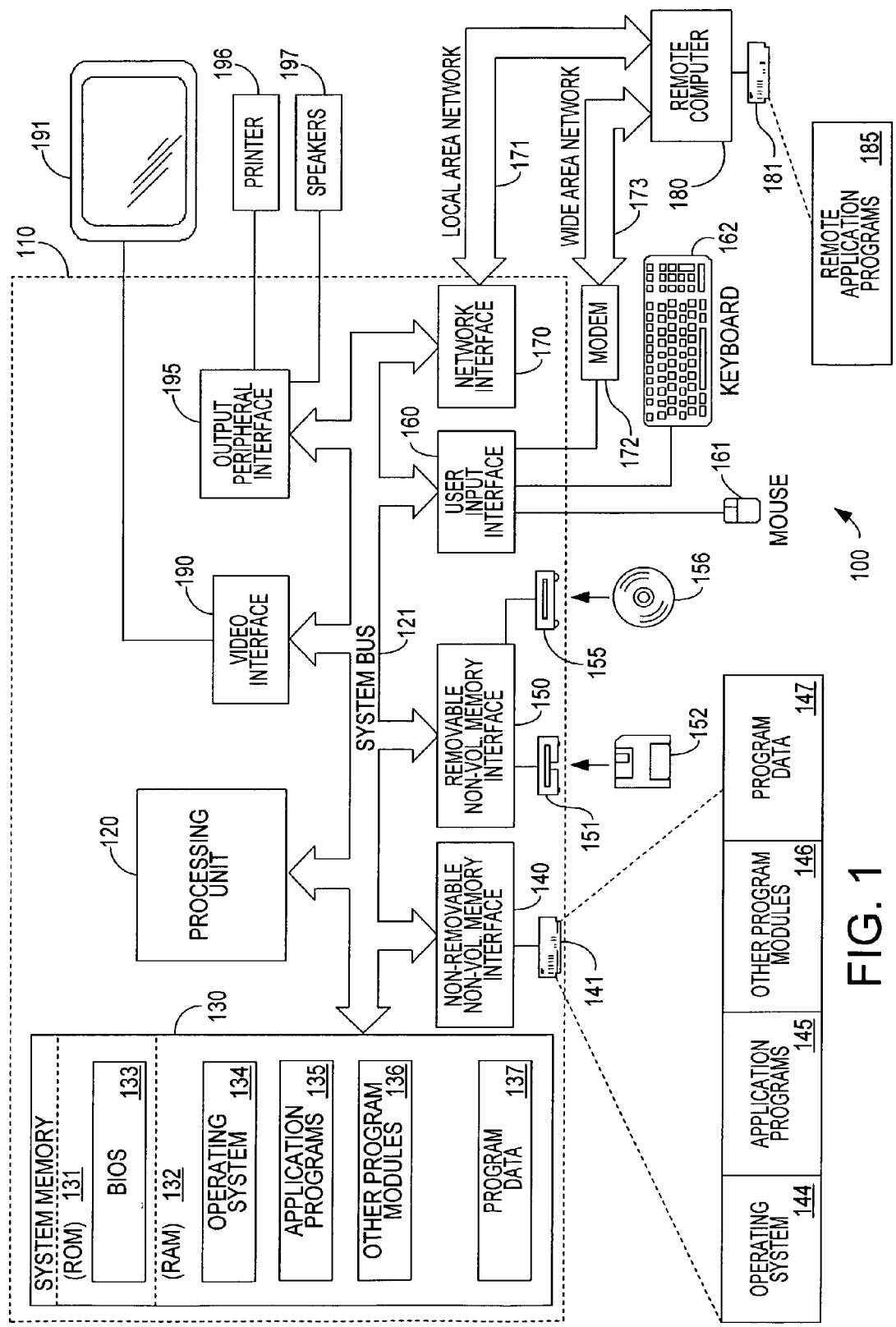
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements; the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computers 10 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the identity management system and method of the instant invention finds particular applicability, although by which the present invention is not limited, is described in co-pending application Ser. No. 09/942,164, entitled Peer-To-Peer Name Resolution Protocol (PNRP) And Multilevel Cache For Use Therewith, filed on Aug. 29, 2001, in co-pending application Ser. No. 10/122, 863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

However, one skilled in the art will recognize from the following teachings that the P2P graphing interfaces and methods of the present invention are not limited to the particular peer-to-peer protocol of these co-pending applications, but may be applied to other resolution protocols with equal force. Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the interfaces and methods of the present invention find particular applicability to and interaction with such PNRP, one skilled in the art will recognize that the present invention is not limited thereby, but has applicability to any P2P system or protocol that desires to provide P2P graph management functions.

As discussed in the above-incorporated co-pending application describing the PNRP and to provide some useful background, establishing peering relations between individual peers is an expensive process in existing peer-to-peer networks. In the PNRP, however, each node accumulates a routing table that contains a list of references to other nodes in the network. For each node entry, address information, which may include a node identification, address, the key of the node, and the distance between the key of this node and the key of the local node are obtained. Each time the local node learns about a remote node, it checks whether the node is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a node receives a query it searches for the entry in its routing table whose key best matches the target, excluding the nodes that have already been visited. The query is then forwarded directly to the node that advertised the entry. If there is no adequate entry, the request is sent back to the node from which the request was received; this node will try another entry in its own routing table. The request is successful if it reaches the entry whose key matches the target. It is unsuccessful if the target is not reached in the maximum number of steps, or if the node from which the request was received tries all possible neighbors and receives a negative response. In the case of successful requests, the response is relayed by all intermediate hops. It carries the address of the node that held the target key, and this entry can be inserted in the routing tables of the intermediate nodes.

Figure 2:
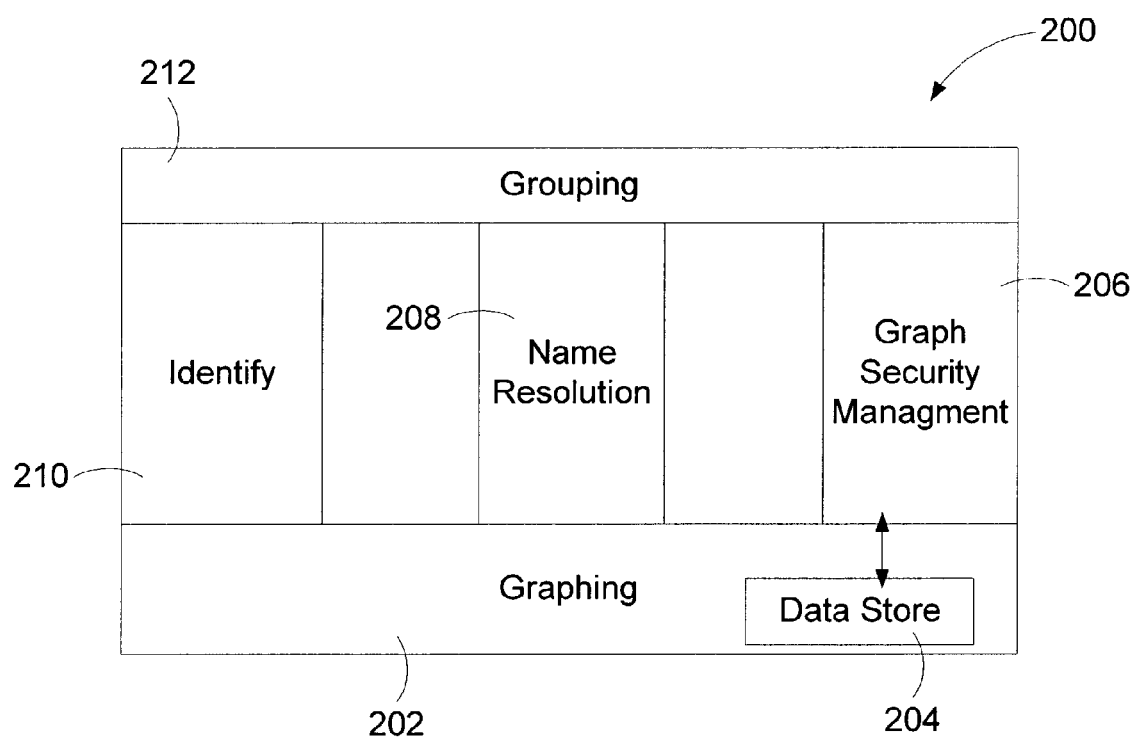
FIG. 2 is a simplified framework diagram illustrating a peer-to-peer (P2P) interface framework into which the system and methods of the present invention find particular applicability.

Having now provided one P2P environment to which the graph management system and method of the present invention finds particular applicability, attention is now directed to FIG. 2. This FIG. 2 illustrates an exemplary P2P framework 200 in which the present invention may exist, although it is not limited for use with only such frameworks. Indeed, the P2P graph management system and methods of the present invention may be used with various frameworks which need or desire a coordinated, logical set of interfaces that allow complete management of P2P identities. Of course one skilled in the art will recognize that various application programs can utilize the APIs of the present invention to provide a rich user interface and a set of functions that allow management of the various user identities that may be desired in the P2P environment.

As illustrated in this FIG. 2, the underlying P2P graphing interfaces 202 utilize a data store 204 that contains all of the information needed in the P2P framework 200. The information in the data store is also utilized by a P2P graph security management interface 206 that provides the security necessary for productive participation in a P2P graph. Some form of P2P name to address resolution 208 must also typically be provided to allow the P2P system to function. As discussed above, one such system is the PNRP system described in the above identified co-pending applications. The P2P graphing interfaces 202 of the present invention are also included in this framework 200. A description of one embodiment of these identity management interfaces 210 is contained in co-pending application Ser. No. 10/309,864, entitled Peer-To-Peer Identity Management Interfaces And Methods, filed on even date herewith, the teachings and disclosure of which are hereby incorporated in their entireties by reference thereto. Finally in this exemplary framework 200, a set of grouping interfaces 212 are provided to allow proper participation in P2P groups.

Turning now specifically to the P2P graphing interfaces 202 provided by the system and methods of the present invention, this group of APIs is exposed to the application writers in order to establish peer-to-peer graphs and to efficiently and reliably pass data between peers. The graphing infrastructure 202 ensures that each node has a consistent view of the data in the graph. The core piece of the graphing technology is the graph node. A node represents a particular instance of an individual on the network. Nodes are able to connect to each other and form a network of nodes or a graph. Nodes are able to send data between each other in the form of records.

Records are essentially pieces of data flooded (sent) to all nodes in a graph. Once a record has been received by a node, the node places the record in a database or data store. Graphing is responsible for ensuring each Node's database has the exact same view of the data. It keeps each node synchronized. As Nodes connect and disconnect from Graphs, partitions or "splits" in the graph may occur. Graphing is also responsible for detecting and repairing these partitions. If it desires to do so, nodes in the graph can create connections separate from the traditional graph connections. These direct connections allow nodes to send arbitrary data to each other. Finally, graphing has an eventing infrastructure that allows applications to register and receive event notifications. Event notifications are the mechanism graphing uses to alert applications to the fact that something has changed within the graph.

Upon initial desire of a user to establish a peer graph, an application program calls the initialization and cleanup functionality of the APIs of the present invention. These APIs are responsible for the start-up and shut down of the graphing infrastructure 202. The graphing start-up routine allows applications to specify the exact version of the infrastructure it wishes to use. Before P2P graphing can be used, the application must call the Peer Graph Startup function to tell the Graphing infrastructure 202 what version it would like to utilize. The Graphing infrastructure then responds with the version requested, and the highest version it supports. The final API that must be called is Peer Graph Shutdown function API. This tells the graphing infrastructure 202 that the application has finished using the infrastructure. In one embodiment of the present invention, each call to the Peer Graph Startup function must be matched by a call to Peer Graph Shutdown function.

These functions utilize a peer version data structure that contains the version information about the P2P graphing infrastructure. The parameters of this structure are the version of the P2P protocols that the installed P2P dynamic link library (dll) expects the caller to use, and the highest version of the P2P protocols that the installed P2P dll can support. Usually, these are the same.

To initiate start up, the application calls the Peer Graph Startup function first before any other functions are called. The parameter passed into this function is the version requested. This is the highest version of the Peer-to-Peer protocols that the caller can use. Preferably this parameter is a word wit the high order-byte specifying the minor version (revision), the low-order byte specifying the major version number. The output parameter for this function is a pointer to the peer version data structure (discussed above) that specifies the version of the P2P APIs and that receives details of the support provided by the P2P dll installed on the system. The return values for this function indicate the success or failure of the operation. The error messages will indicate the type or reason for failure. They include errors as a result of insufficient memory to complete the requested function, errors resulting from the specification of an unsupported version, i.e. the version requested is not supported by the P2P subsystem installed on the local machine.

To initiate shut down, the application calls the Peer Graph Shutdown function. This function cleans up any resources allocated by the call to the API Peer Graph Startup. As indicated above, there is preferably one call to Peer Graph Shutdown for each call to Peer Graph Startup. There are no required parameters for this function. This function returns an indication of success or failure of the shutdown function. In the case of error, the function returns an appropriate error code.

After calling the Peer Graph Startup function, the next task an application has to do is to setup a graph for use. It does this by calling either the Peer Graph Create function or the Peer Graph Open function. If the application would like to create a brand new structure, it must first specify the properties of the graph. The properties specify the basic elements needed to setup the graph. Next, the application must specify a database name to associate with the node. In addition to the properties and database name, the application must also specify the security interface it would like to use to add security to the graph. Finally, the application calls the Peer Graph Create function to create a new graph. After an application creates a graph, it must call the Peer Graph Listen function to "listen" for incoming connection requests from remote nodes.

The second way an application can set up a graph for use is to open an existing graph. There are two scenarios when an application would like to open a graph. In the first scenario, the Graph is being opened by the node for the first time (i.e. no data for that graph exists in the node's database). In this situation the application must first call the Peer Graph Open function. In this call the application must specify the graph to which to connect, the identity to use in the graph, and the database to associate with the graph. Further, the application must specify the same Security Interface the creator of the graph specified in Peer Graph Create function that originally created the graph. After an application "opens" the graph for the first time, the application must call the Peer Graph Connect function using an IP of a node that the application has "discovered" (via some out of band (OOB) mechanism). Since the node does not yet have a database, any call to the Peer Graph Listen function will fail. Once the graphing layer 202 has synchronized the node with the rest of the graph (as will be discussed below), the application is free to call the Peer Graph Listen function to "listen" for incoming connection requests from remote nodes.

In the second scenario, it is possible for a node to "open" a graph again once it has been disconnected. The application must specify the same information as the first time it opened the graph. The difference now is that since the node has a database from this prior involvement with the graph, any call to the Peer Graph Listen function will succeed. However, this should only be done after no other node was discovered to which to connect, or again after receiving the synchronized event after calling the Peer Graph Connect function utilizing the IP address obtained via the discovery mechanism 208.

Once a node has created or opened a graph, it receives a graph handle. This handle is used in most of the following graphing APIs of the present invention. When a node wishes to disconnect from the graph, all it need do is call the Peer Graph Close function to close the graph.

In the foregoing description of the graph startup and shutdown process, the application was required to specify the peer graph properties. This is done through the Peer Graph Properties data structure, which holds data about graph policy and other information. The information included in this data structure includes a specification of the size, in bytes, of this data structure. The information also includes a bitmask of the peer graph property flags pertaining to the peer's behavior in a graph. These flags are discussed below. A Scope Flag defining in what scope the graph ID should be published, e.g. link-local, site-local, etc. The application should also specify in this structure the maximum size (data and attributes) of a record that can be flooded in the graph. A unique graph ID identifier for this graph, which will be set by the Peer Graph Create function must also be specified. This identifier must be unique for the machine/user combination. Further, a unique creator ID identifier for the creator of the graph is required. The friendly name of the graph should also be provided in this structure, although this may be set to NULL. An optional comment field to describe the graph is also provided in this structure. To limit the Presence Lifetime of a record in the graph, the number of seconds before a presence records should expire is provided. Finally, the maximum number of presence records that one graph can contain is specified. The default for this is to let it be calculated dynamically based on actual graph size.

The peer graph property flags introduced above include a heartbeat flag and a defer expiration flag. The heartbeat flag is specified at graph creation time and determines whether or not nodes in the graph will publish heartbeats to let other nodes in the graph know of their continued existence in the graph. The defer expiration flag indicates that, when a graph is not connected, expiration will not occur until the node is connected to at least one other node in the graph.

Once the graph has been established, the node needs to utilize some form of security to validate records and to authenticate people into the graph. The peer security interface of the present invention that provides this functionality allows the application to specify the security interfaces to the graphing infrastructure 202 that the APIs will call to validate users, and to secure and free records in the graph. In addition, this security interface allows an application to specify the path of the dll containing an implementation of a security SSP. If an application specifies NULL for the callbacks, then the infrastructure puts a CRC checksum in the security fields of the record instead of calling a function to secure the record. In such a situation, instead of calling a function to validate the record, the infrastructure will instead verify the CRC checksum.

The parameters for the structure used for this security interface include the size of the structure, an optional full path name of a DLL which implements the SSP interface, and an optional package name. The parameters may also include the byte count of the security information and a pointer to the security information (bytes which will be used in the creation or opening of a graph). An optional pointer to the security context and to the validate record function, which will be called when a record needs to be validated, may be included as well. If the pointer to the security record is NULL, then this validate record pointer should be NULL as well. Further, a pointer to a function which will be called when a record needs to be secured may be included. However, if the pointer to the validate record function is NULL, this must be too. Finally, this security interface structure may include a pointer to a function used to free any data allocated by the secure record callback.

The peer validate record callback specifies the interface to call in order to validate records. When this API is called by the infrastructure, one of the peer record change types is passed in. This is the operation just performed on the record. The application should verify the record based on the change type. If the application still needs more information to verify the record, it can return E_DEFERRED and the graphing API will put it in a set aside list. Once the security mechanism has enough information to validate the record, it must call a peer graph validate deferred records function. Once this function is called, any record in the set aside list will be submitted for validation again. The parameters for the peer validate record function include the graph associated with this record, a pointer to the security context, the record to validate, and the peer record change type describing the reason for the validation.

The peer record change type flags are passed to the callbacks through the change type parameter. They are provided to inform the function how the specific record changed. This gives the security functions the ability to act on the type of record change. For example, these change types can include the addition of a peer record (a record ID or record type has been added to the database), the updating of a record (a record ID or record type has been updated in the graph), the deletion of a record (a record ID or record type has been deleted from the graph), or the expiration of a record (a record ID or record type has expired out of the database).

The peer secure record callback specifies the interface to call in order to secure records. When this API is called by the infrastructure one of the peer record change types is passed in. This reflects the operation just performed on the record. The application should then verify the record based on the change type. The parameters for this callback include the graph associated with this record, a pointer to the security context, the record to secure, the peer record change type flags describing the reason for the validation, and the security data for this record (e.g. the signature).

The peer free security data callback specifies the interface to call in order to free data returned by the security callbacks. Its parameters includes the graph associated with this, record, a pointer to the security context, and a pointer to the security data to be freed. The function returns an indication of success if the operation succeeds; otherwise, the function returns an error value indicating the type of error encountered. These include an error resulting from an invalid parameter, an insufficient amount of memory, and an error if a graph with that particular P2P ID already exists.

It should be noted that the peer address tag structure holds information about the IP address to use when connecting to the graph node. This structure includes parameters indicating the size of the structure being passed in, and the IPv6 address of the node to connect to.

Having now provided a description of the creation and management of peer graphs, including the security interface, attention will now turn to the details of the specific interfaces required to accomplish the functions discussed above.

As discussed above, a call to the peer graph create interface creates an entirely new graph. It also provides the opportunity to specify information pertaining to the graph and the type of security that the graph will be using. This call results in a graph handle being allocated, but not the establishment of network connections. After calling this function, an application has the opportunity to subscribe to events before it calls the peer graph listen function. These event APIs are the only APIs that can be called successfully if the application is not connected to the graph. Any other API calls during this period will fail until the peer graph listen API is called. The parameters for this peer graph create interface include all of the properties of a graph, the name of the database to associate with this graph at time of creation, and a pointer to the security interface that contains all of the required information about the security provider for this graph. This parameter is optional, i.e. it can be NULL. If it is set to NULL, the API uses the CRC Checksum mechanism discussed above. The output of this API is set to the handle for the graph that was created.

The peer graph open API discussed above opens a graph that has been created previously, either by the local node or by a remote node. This call results in a graph handle being allocated, but not the establishment of network connections. As with the preceding API, after calling this API the application has the opportunity to register for events. However, the application has to call the peer graph listen API in order to accept incoming connections. It should be noted that, if this is the first time a graph has been opened by this node, any call to the peer graph listen API will fail until the node has connected and synchronized to the graph. In this way this node cannot flood a new node with outdated or erroneous information (records).

The parameters for this peer graph open API include a unique graph identifier of the graph to open (must be unique for the machine/user combination), a unique identifier for the person opening the graph, and the name of the database to associate with this graph at time of creation. A pointer to the security interface that contains required information about the security provider for this graph may also be provided. If used, this must be the same as the security interface specified in the peer graph create function. The parameters also include a count of record types in the record synchronize precedence array, and the array of record types indicating the order in which records are to be synchronized. This parameter can be NULL if a default order is to be used. Finally, a handle to the graph that was created is provided. This API returns an indication of success or failure of the function. These error indications include an indication of an error due to an invalid argument and an indication of an error because no other graph member could be found to process the connect.

Once the graph has been created or opened as discussed above, the peer graph listen API is called to inform the graph to start listening for incoming connections. That is, before this API can be called, a call must be made to the peer graph create or peer graph open APIs. Also as indicated above, if this is the first time a graph has been opened, any call to this API will fail until the node has connected via the peer graph connect API and synchronized its records with the graph. The parameters for this API include the graph to start listening on, the IPv6 scope to listen on, the IPv6 scope ID on which to listen, and the port on which to listen. This API returns an indication of success or failure. These error indications include an indication of an error due to an invalid argument, an indication of an error due to insufficient memory, and an indication of an error because the handle supplied is invalid.

When a node desires to make a connection to a new node in the graph, it calls the peer graph connect API. If this is the first connection, this API will also attempt to synchronize the graph database. The parameters for this API include the handle of the graph, the unique ID of a person to whom to connect at a given address (required since multiple identities may be connected at the specified address), a pointer to the structure that contains details about address, etc., of the node to which to connect, and a pointer to the connection ID, which is used with the direct communication APIs discussed below. This API returns an indication of success or failure. The error indications include an indication of an error due to an invalid argument, an indication of an error due to insufficient memory, and an indication of an error because the pointer supplied is invalid.

The peer graph close API invalidates the graph handle obtained by the call to the peer graph create API or to the peer graph open API. It also closes down all network connections for this graph. The parameter for this API is the handle of the graph from which to disconnect. This API returns an indication of success or failure. These error indications include an indication of an error due to an invalid argument, and an indication of an error because the handle supplied is invalid.

While the peer graph close API allows a node to disconnect from a graph, it does not delete that graph. To perform such a deletion of the data of an associated graph, an application would need to call the peer graph delete API. The parameters for this API include the name of the graph from which to delete the data, the peer ID from which to delete the data, and the name of the database associated with the graph to delete. This API returns an indication of success or failure. These error indications include an indication of an error due to an invalid argument, an indication of an error because the handle supplied is invalid, and an indication of error due to a denial of access to perform the requested function.

In addition to the graph formation and management functions provided by the system and methods of the present invention just discussed, the present invention provides application programming interfaces that allow an application to retrieve and manage graph and node information. The management of this information is facilitated by a peer node information data structure that contains node-specific information. The parameters of this data structure include the size of the data structure, a unique identifier which identifies the nodes connection to its neighbor, the Identifier of the peer (set for the node during the create or open function described above), the count of addresses in the array of peer addresses, an array of peer address structures indicating which addresses and ports for which this instance is listening for group traffic, and a string data field used for containing attributes describing this particular node.

One interface of the present invention that utilizes this data structure is the peer graph get node information API. This interface is called to retrieve node-specific information about the node on which the user is. Note that there may be several nodes of a graph on a given machine, e.g. multiple users may have joined the graph on a given machine, so this information really is node-specific, not per-machine. The parameters for this interface include the graph handle, and the node ID of the node about which the application wishes to get information. If set to zero, this interface will retrieve information about the local node. The output is the peer node information data structure, which contains information about the local node. This API returns an indication of success or failure. The error indications include an indication of an error due to an invalid argument, an indication of an error due to insufficient memory, and an indication of an error because the handle supplied is invalid (e.g. the node is no long connected to the graph).

In addition to retrieving information about the node, the present invention allow an application to set the attributes of the peer node information data structure for the instance of the local node. The parameters for this function includes the graph handle, and a string representing the attributes that the application would like to associate with the local node. This API returns an indication of success or failure. The error indication includes an indication of an error due to an invalid argument.

In addition to the ability to retrieve node information, the present invention provides the ability to retrieve properties of the current graph. An application can call the peer graph get properties function, which retrieves the current graph properties. The structure returned contains information about the current graph properties. The parameters of this function are the handle of the graph, and on success, a pointer to the graph properties structure. This API returns an indication of success or failure. The error indications include an indication of an error due to an invalid argument, and an indication of an error due to insufficient buffer size.

The present invention also allows for the retrieval of the status of the group through a call to the peer graph get status function. The parameters for this function are the handle to the group, and a set of peer graph status flags that are currently set as the status of the group. These flags may be used to indicate whether or not the node is listening for connections, whether or not the node has connections to other nodes, and whether or not the node's database is synchronized.

In addition to retrieving information, the present invention also provides an interface that allows an application to set the graph properties. The parameters of this function include a handle of the graph, and pointer to the graph properties structure. Preferably, this interface allows an application to modify the graph size, the friendly name, the number of presence records that the graph can contain, and the number of seconds before a presence record should expire (the presence lifetime). This API returns an indication of success or failure. The error indications include an indication of an error due to an invalid argument, and an indication of an error due to a denial of access.

The system and methods of the invention also provide an interface that converts the current graph time to the local system time. The parameters for this interface include the handle of the graph, a pointer to the graph time to be converted, an output that is set to the local system time derived from graph time. This API returns an indication of success or failure. The error indications include an indication of an error due to an invalid argument, and an indication of an error due to a denial of access.

Having now discussed the graph initialization and cleanup functions, the graph creation and access functions, and the graph and node information functions of the present invention, attention is now turned to the record management functions of the present invention. Records are the method of communication between nodes in a graph. Records are used to shape the graph and ensure well-connectedness. A record comprises two parts: 1) the header, which contains information about the record including the version, creator and type; and 2) the content portion, which is the application defined data to be flooded throughout the group. This content portion also contains an XML structure that allows applications to add name-value attributes that describe the data. This field can be used to specify information for a search API to examine.

In accordance with an embodiment of the present invention, once a node is "listening" on a graph, the node can manipulate the data communicated and stored in the group. The first thing an application must do is obtain a record. It can do this in one of two ways: 1) create a brand new record; or 2) utilize an access function. To create a brand new record the application begins by filling out a peer record with the needed information and data. Once it has done this, it calls the peer graph add record function to add the record to the database. In addition to adding the record to the database, this function floods the record to the rest of the nodes in the graph.

If, instead, the application decides to obtain an existing record, it can utilize an access function of the present invention. There are several such functions that applications can utilize to retrieve records from the database. The first is the peer graph get record function. This API gets a specific record from a record Id (which is a GUID) specified by the application. The second is via an enumeration function, such as the peer graph enumerate records API or the peer graph search records API. The peer graph enumerate records API returns an enumeration of records based on a record type or a node's identity. The peer graph search records API accepts a search query that is used to filter records based on data in the attribute field. Each API returns an enumeration that can be used with the peer networking enumeration APIs (discussed below).

Once a record has been created or retrieved, an application can either update or delete the record. If an application wishes to update a record, it simply updates the fields it wishes and calls a peer graph update record API. This API updates the record in the database and floods the record to each node in the graph. Finally, a record can be deleted from the graph by calling a peer graph delete record API. It is important to note that this API does not actually remove the record from the database. Rather, it marks the record for deletion and floods this deletion to the rest of the graph. The record is not removed from the database until it expires.

The record management structures that are used by the APIs of the present invention include the peer data structure. This record object that an application sees is defined by the peer data structure and includes as its parameters the size, in bytes, of data pointed to by a buffer pointer, and a pointer to the buffer containing data itself.

The peer record data structure includes as its parameters the size of the structure, which should be set to the size of the peer record header. The parameters also include the type of record, the ID of the record supplied by P2P infrastructure, and the record version supplied by the infrastructure when an application on calls to the peer graph add record API or the update record API. This data structure may also include various flags indicating any special processing that should be applied to record. The unique identifier of the record creator is also included, as is an unique identifier of the last person to change the record. The data structure also includes a set of attribute-value pairs to be associated with record, specified as an XML string. Attributes are the place the search engine looks for data pertaining to the record. This is the place applications can put information about the contents of the record that will be found by the engine. In order for the engine to recognize and "find" attributes, this string must follow a search XML schema. If it does not, the search engine will not return results pertaining to this record. The UTC time that the record was created as supplied by the P2P infrastructure, the UTC time that the record will expire, and the UTC time that the record was last modified are also included in the structure. Security data for the peer data structure, which uses CRC checksum as a default, is also included. Finally, this data structure includes the actual record data.

The flags discussed above include a peer record flag called auto refresh. This flag is used to tell the grouping APIs used in the P2P system to automatically refresh this record when it is about to expire. The other peer record flag that may be set is called deleted. This flag indicates that the record is marked as deleted.

Having now provided a discussion of the record management APIs and data structures of the present invention, attention will now turn to the details of each of the individual record management APIs mentioned above. First, the peer graph add record API is used to add a new record to the graph as introduced above. A record added with this API is flooded to each node in the graph. The parameters for this API include the graph handle, a pointer to record data, and a pointer that is set to the record ID that uniquely identifies a record in a graph. It is noted that only the size, type, and expiration are required in the record, while the data and attributes are optional. This API returns an indication of success or failure. The error indications include an indication of an error due to an invalid argument, and an indication of an error due to a denial of access. The denial of access error results when a peer tries to add a record type that it is not allowed to add.

The peer graph update record API introduced above updates a record within the graph. Further, this function updates the version number, and floods the record to each node in the graph. The parameters for this function include the graph handle, and a pointer to the new data to associate with record. The fields in the record that can be modified are the size, the flags, the attributes, the expiration time (to a higher expiration time), the security data, and the data itself. This API returns an indication of success or failure. The error indications include an indication of an error due to an invalid argument, and an indication of an error due to a denial of access.

The peer graph delete record API, as discussed above, marks a record as deleted within the graph. This API does not actually remove the record from the database. Rather, it marks the record as deleted and floods it to the graph. This is done to ensure that each node in the graph has an identical view of the database. The parameters for this API are the graph handle, a pointer to the record ID to delete, and a local flag. If this flag is set true, this API does not flood the deletion to other nodes in the graph. Rather, the API just removes it from the local database. This API returns an indication of success or failure. The error indications include an indication of an error due to an invalid argument, and an indication of an error due to a denial of access. Deleting a record means marking the record as invalid by updating it with a peer RF invalid flag set in the record header and then letting the record expire. However, the actual record payload is preferably deleted.

The peer graph get record API allows an application to retrieve a specific record via a record Id. The returned record should be freed by calling the peer graph free data API. The parameters for this API are the graph handle, a pointer to the record ID to retrieve, and a pointer that is set to a pointer to the retrieved record. This API returns an indication of success or failure. The error indications include an indication of an error due to an invalid argument, an indication that the record is not in the database, and an error due to a denial of access.

The peer graph enumerate records API starts an iteration over all records of a specific type/and or creator. This is a snapshot of the records at a current time. The parameters for this API are the graph handle, and a pointer to a type of record over which to iterate. If the pointer is NULL, the API will iterate over all records. The API also includes a parameter that identifies a peer ID. If specified, the API will iterate over only records created by that peer ID. If NULL, the API iterates over records created by all users. The API also generates a handle to the iteration. This API returns an indication of success or failure. The error indication includes an indication of an error due to an invalid argument.

The peer graph search records API is used to search for specific records. The parameters of this API are the graph handle, an XML string describing the query, and an enumeration handle. This API returns an indication of success or failure. The error indications include an indication of an error due to an invalid argument, an indication of an error due to a failure to initialize, and an indication of an error due to the lack of further records.

When a new record comes in from the graph neighbors, the peer graph validate deferred records API will attempt to validate the record by calling into the validate record callback, which is specified in the peer security interface during calls to the peer graph create or peer graph open APIs. There may be cases where the security module does not yet have all the information required to perform the validation. In such a circumstance, instead of validating the record, the API will return a deferred error message. The graphing layer then moves the record to a temporary deferred table. When the security module is prepared to perform the validation, it can call the peer graph validate deferred records API to ask the graphing layer to resubmit any deferred records. The parameters include the graph handle, and a count of record IDs specified in the pointer to record IDs. If this is zero, the graphing layer will call the validate record function for every record currently deferred. Finally, this API includes the parameter of a pointer to the array of record IDs that should be re-validated. This API returns an indication of success or failure. The error indications include an indication of an error due to an invalid argument, and if not initialized.

Having completed the description of record management APIs of the present invention, attention is now directed to the export and import APIs that form part of the graphing APIs of the present invention. An application can export the database to a specific file by calling the peer graph export database API. It can only do this after the node has connected to the graph at least one time and the application has called the peer graph open API discussed above. An application can also import a database by calling the peer graph import database API. It can only do this once it has a valid graph handle.

The peer graph export database API exports the graph database into a file that can be moved to a different machine and imported there by calling the peer graph import database API. The parameters of this API are a handle of the graph, and a path to the file in which the exported data is to be stored. If that file already exists and contains any data, the data in it will be overwritten. This API returns an indication of success or failure. The error indication includes an indication of an error due to an invalid argument.

The peer graph import database API imports a file representing the graph database that is obtained by calling the peer import graph database API. This API can only be called successfully if the user has not yet called the peer graph listen API discussed above. The parameters for this API include a handle of the graph and a path to the file to import. This API returns an indication of success or failure. The error indication includes an indication of an error due to an invalid argument.

The graphing APIs of the present invention also allow the management and communication of presence information related to the node. The peer graph set presence API is used to inform other graph members that a node is actively connected and listening to the graph. The parameters of this API are the graph handle, and a flag that, if true, floods information to that graph that the node is "present." This API returns an indication of success or failure. The error indications include an indication of an error due to an invalid argument, and if not initialized.

The peer graph enumerate nodes API is used to start an enumeration of all nodes in the graph. Depending on graph policy it is possible that some nodes that are connected will not show up in the enumeration because they do not have their presence published. The parameters for this API are the graph handle, the Peer ID for which an application wants to obtain a node enumeration, and a pointer to the enumeration handle used to iterate over the present peers. The application uses the peer graph get next item API to retrieve the actual peers, and uses the peer graph end enumeration API to release resources associated with this enumeration. When the peer graph get next item API is used on an enumeration handle returned from a call to the peer graph enumerate presence API, it will return data of the type peer node information. This API returns an indication of success or failure. The error indications include an indication of an error due to an invalid argument, and if not initialized.

The graphing APIs of the present invention also include utility and support functions. There are two types of utility and support functions. The first is enumeration support and the second is memory support. The enumeration functions operate on any handle to a peer enumeration that the application has received. A handle to a peer enumeration can be obtained from functions such as the peer graph enumerate records API and the peer graph search records. Once an enumeration is obtained, the application can get the count of items in the enumeration by calling the peer graph get item count API. To get items from the enumeration, the application must call the peer graph get next item API. An application can specify the number of items it would like to receive from the enumeration. If an application requests more items than what is in the enumeration, the function will return the number of items in the enumeration. The memory support function is peer graph free data function. If an application has received a piece of data from a graphing API, it must use this function to "free" the data. Additionally, the peer graph get next item API returns data that must be freed using the API.

The peer graph get next item API gets next items in an iteration started by a call to any API that returns a handle to a peer enumeration. Such APIs include the peer graph enumerate records API, the peer graph search records API, the peer graph enumerate neighbors API, and the peer graph enumerate presence API. All items returned should be freed using a single call to the peer graph free data API. The application can request a range of records to be returned. The API will return equal or less than the number of records requested. The default number returned is one. The parameters for this API are the enumeration handle, the number of items to read (on return, contains the actual number of items read), and a pointer to the array of items. The actual data returned depends on the type of enumeration This API returns an indication of success or failure. The error indications include an indication of an error due to an invalid argument, if there are no more items, and if not initialized.

The peer graph end enumeration API terminates and frees up any resources associated with an enumeration. An error indicating that there are no more items is returned if the enumeration does not contain any more items. The only parameter for this API is the handle to the enumeration to cleanup. This API returns an indication of success or failure. The error indication includes an indication of an error due to an invalid handle.

The peer graph get item count API is used to retrieve the maximum number of items in an enumeration. Since some items may become invalid while iterating over the enumeration, the number of items returned from the peer graph get next item API may be less than the item count returned here. This is indicative of the number of items in the enumeration when the handle is first created. Due to the dynamic nature of the infrastructure, there is no guarantee that the number of items retrieved via the peer graph get next item API will be equal to this count. The parameters for this API are the graph handle, and the number of records in the enumeration. This API returns an indication of success or failure. The error indication includes an indication of an error due to an invalid argument.

The peer graph free data API frees resources returned by various graphing APIs discussed above. Any data returned by a graphing API must be freed using this API. The parameter for this API is a pointer to item to free.

The system and methods of the present invention also provide for node to node direct communication. The direct communication APIs allow nodes to send messages to each other without having to flood the data. An application can send data to either a neighbor (i.e. a node with whom it has a connection because of the graphing infrastructure) or a direct connection (i.e. a remote node that is connected to the local node because it initiated the connection with a direct communication API). If an application wishes to create a direct connection, it must call the peer graph open direct connection API first. This establishes the connection. Once the connection is established, the node is able to send data on it via the peer graph send data API. It is important to note that the application can describe the type of data being sent via the "type" parameter in the send API. Once an application is finished with a direct connection, it must call the peer graph close direct connection API to tear down the connection. A direct connection does not count in graph maintenance. An application can also send data to a neighbor node by specifying the neighbor flag and using the peer graph send data API. It need not call either of the direct connection establishment/closing functions.

These direct connection APIs utilize a direct communication structure called the peer connection information structure. The parameters for this structure include the size of the structure being passed in, the type of connection to which this structure refers, the connection ID of this connection, the node ID of the node on the other end of this connection, the Peer ID of the node to which the application has a connection, and the address of the connection. The type of connection is indicated by two flags. The peer connection neighbor flag specifies that this connection is a neighbor connection, and the peer connection direct flag specifies that this connection is a direct connection.

The peer graph open direct connection API creates a direct connection as stated above. The graphing APIs allow an application to establish a connection with a node in the graph in order to send data. This connection does not count towards graph maintenance. The parameters for this API include the handle of the graph, the unique ID of a person to whom to connect at an address (required since multiple identities may be connected at the specified address), a pointer to structure containing details about address, etc. of the node to which to connect, and the connection ID of this direct connection. This API returns an indication of success or failure. The error indications include an indication of an error due to an invalid argument, and if no peer with the given ID exists. There may also be an error to denote that the peer node refused the connection.

The peer graph close direct connection API closes down a specific direct connection. The parameters for this API are the handle of the graph, and the ID of the neighbor to disconnect. This API returns an indication of success or failure. The error indications include an indication of an error due to an invalid argument, and if no connection with the given ID exists.

The peer graph send data API is used to send data to a connected neighbor or a direct connection. This function will return as soon as data has been handed off to the network layer. In other words, the graphing layer does not wait for an ack from the other side. The parameters for this API include the handle of the graph, the unique identifier for the connection on which to send data, an application defined "type" of the data sent, a count of bytes pointed to by the next parameter, and the actual data to send to the neighbor. The mechanism for receiving this point to point data is to register for an event of type peer graph event incoming data. This API returns an indication of success or failure. The error indications include an indication of an error due to an invalid argument, and if the connection does not exist.

The peer graph enumerate connections API includes as its parameters the handle of the graph, the type of the connection to enumerate based on the peer connection flags discussed above, and a pointer to the enumeration of connections. This API returns an indication of success or failure. The error indications include an indication of an error due to an invalid argument, and if the connection does not exist.

The events infrastructure of the present invention allows applications to be notified about changes to the graph and the data associated with it. If an application would like to receive a notification about a change, the first thing it must do is fill out a registration structure that specifies the event about which it would like to be notified. The registration allows applications to specify the event type about which it would like to be notified. If the event has a specific type of data with which it can be associated, this is also specified in the registration. For instance, an application can register for notifications about changes to a particular record type. To do this, it creates a registration structure specifying the peer graph event record changed event as the event type, and the GUID of the record type about which it would like to be notified.

Once an application has the registration structure, it calls the peer graph register event API, specifying the event handle with which it would like the event associated. It is important to note that several events can be associated with an event handle. Once an event occurs for which the application is interested, the event handle gets signaled that an event has occurred. The application must now call the peer graph get event data API to retrieve the data associated with the event. This API returns a structure that contains two key pieces of data. The first is the registration associated with the event, and the second is the data associated with that event. An application should continue to call the peer graph get event data until the error message indicating that there are no more items occurs. When an application no longer wants to be notified about events associated with a particular handle, it simply un-registers its interest by calling the peer graph un-register event API.

The events infrastructure of the present invention utilizes seven data structures. The first is the peer graph event registration structure. When an application registers for an event notification, it supplies an array of peer event registration structures, which contain context data needed to interpret the notification registration and which will be used to return data relevant to a notification when one occurs. This parameters of this structure include the type of events in which the peer is interested (must be one of the event types specified below), and the record type. If the event type specified operates on records, this record type may be specified to only fire events on records of the specified record type. This parameter may be NULL to have the event fire for all record types. This field is ignored for event types that do not operate on records. The registration takes an event type for which the application wants to be notified.

The event types may include events related to the graph has changed status (became connected, etc), a field in the graph property structure has changed (no data is available if this event is fired because the application already has the change and must use the peer graph get properties API to get the updated structure), a record type (or specific record) has changed in some manner, a peer's direct connection has changed, a connection with a peer neighbor has changed, data has been received from a direct or neighbor connection (as opposed to flooded), that the graph has become unstable (the client should respond by calling the peer graph connect API on a new node), a node's presence status has changed in the graph, and a certain record type has been synchronized.

Once an application receives an event notification, it can get the data associated with that event. All data is generalized into the peer graph event data structure. Depending on the event, the appropriate field in the union is filled out. All but one of the fields in the union is a pointer to a structure. Each member of the union is defined. Nothing in this structure can be "set." The event type is event data corresponds to the event, the status field is filled in if the peer graph event status change event fires. It means something has happened in relation to a node's connection with the graph. The incoming data field is filled in if the peer graph event neighbor data or the peer graph event direct data event is fired. This means that a node has received data from the neighbor or a direct connection not flooded. The record change data field is filled in if the peer graph event record change event is fired. It means that a record or record type for which the application asked for notifications has changed. The connection change data field is filled in if the peer graph event neighbor connection or the peer graph event direct connection event is fired. It means that some aspect of the neighbor or direct connection state has changed. The node change data field is filled in if the peer graph event node changed event is fired. It means that some node in the graph presence state has changed. The synchronized data field is filled in if the peer graph event synchronized event is fired. It means that some record type has finished synchronizing.

In the peer event incoming data structure, the union contains a pointer to the data if an incoming data event is fired. It means that a node has received data from the neighbor or a direct connection, not flooded. The fields of this structure include the size of the structure, the unique identifier for the connection that the data came from, the application defined data type of the incoming data, and the actual data received.

The peer event record change data is the structure to which the union contains a pointer if the peer graph event record change event is fired. It means that a record or record type for which the application has asked for notifications has changed. This structure includes the size of the structure, the type of change that has occurred to a record or record type for which the application has subscribed events, the unique record ID that has been changed, and the unique record type that has been changed. The peer record change types include the peer record added type to indicate that a record ID or record type has been added to the database, a peer record updated type to indicate that a record ID or record type has been updated in the graph, a peer record deleted type to indicate that a record ID or record type has been deleted from the graph, and a peer record expired type to indicate that a record ID or record type has expired out of the database.

The peer event connection change data structure is the data structure to which the union contains a pointer if the peer graph event neighbor connection event or the peer graph event direct connection event is fired. This means that some aspect of the neighbor or direct connection state has changed. This structure includes the size of the structure, the type of change the neighbor or direct connection has experienced, the unique identifier for the connection from which the change came, and the unique identifier for the node from which the change came. The peer connection status types include a peer connected type indicating that a new node has connected to the local node, a peer disconnected type indicating that the connection has disconnected (could be done by the local node or by a remote node), and a peer connection failed type indicating that the connection attempt to the node has failed.

The peer event node change data structure is the structure to which the union contains a pointer if the peer graph event node change event is fired. This means that some node in the graph has changed its presence state. The structure includes the size of structure, the node's new presence state (peer presence change type), the graph unique ID of the node that has changed, and the peer ID of the node that changed. The peer presence change types include the peer presence change connected type indicating that the node has become present in the graph, the peer presence change disconnected type indicating that the node has disappeared from the graph, and the peer presence change updated type indicating that the node has updated his information (e.g. attributes).

The peer event synchronized data structure includes the size of the structure and the type of record that was synchronized.

Having now described the events infrastructure and the data structures used therein, attention is now directed to the details of the individual APIs. The peer graph register event API registers the peers interest in being notified of changes associated with a graph and event type. The parameters for this API include the handle of the graph, and an event handle to be signaled on a new event. The event handle should be auto-reset. When signaled, the application must call the peer graph get event data API until an indicating that there are no more items to retrieve is returned. The parameters also include a count of the number of peer event registration data structures, a pointer to an array of peer event registration data structures containing data about notifications being requested, and a peer event handle that can be used in a call to the peer un-register event handle API to un-register a notification. This API returns an indication of success or failure. The failure indication includes an indication of failure due to an invalid argument.

The peer graph un-register event API un-registers the application's interest in being notified of changes associated with a graph and record type. The parameter for this API is the handle obtained from call to the peer register event handle API. This API returns an indication of success or failure. The failure indication includes an indication of failure due to an invalid argument.

The peer graph get event data API allows an application to retrieve events. An indication is returned to indicate that there are no more events to retrieve. All events receive data in the form of the peer graph event data structure. Depending on what event was fired, the corresponding data structure is returned. The parameters for this API include the handle obtained by a call to the peer register event handle API, and the data about the notification.

In one embodiment of the interfaces and methods of the present invention that is particularly well suited for the Microsoft Windows XP operating system, the APIs may be as follows:

```
// Graph interfaces
HRESULT WINAPI PeerGraphStartup(
    IN     WORD            wVersionRequested,
    OUT    PPEER_VERSION_DATA pVersionData);
HRESULT WINAPI PeerGraphShutdown( );
VOID WINAPI PeerGraphFreeData(
    IN     PVOID           pvData);
HRESULT WINAPI PeerGraphGetItemCount(
    IN     HPEERENUM       hPeerEnum,
    OUT    PULONG          pCount);
HRESULT WINAPI PeerGraphGetNextItem(
    IN     HPEERENUM       hPeerEnum,
    IN     OUT PULONG      pCount,
    OUT    PVOID           * ppvItems);
HRESULT WINAPI PeerGraphEndEnumeration(
    IN     HPEERENUM       hPeerEnum);
HRESULT WINAPI PeerGraphCreate(
    IN     PPEER_GRAPH_PROPERTIES pGraphProperties,
    IN     PCWSTR          pwzDatabaseName,
    IN     PPEER_SECURITY_INTERFACE pSecurityInterface,
    OUT    PHGRAPH         phGraph);
HRESULT WINAPI PeerGraphOpen(
    IN     PCWSTR          pwzGraphId,
    IN     PCWSTR          pwzPeerId,
    IN     PCWSTR          pwzDatabaseName,
    IN     PPEER_SECURITY_INTERFACE pSecurityInterface,
    IN     ULONG           cRecordTypeSyncPrecedence,
    IN     GUID *          pRecordTypeSyncPrecedence,
    OUT    PHGRAPH         phGraph);
HRESULT WINAPI PeerGraphListen(
    IN     HGRAPH          hGraph,
    IN     DWORD           dwScope,
    IN     DWORD           dwScopeId,
    IN     WORD            wPort);
HRESULT WINAPI PeerGraphConnect(
    IN     HGRAPH          hGraph,
    IN     PCWSTR          pwzPeerId,
    IN     PPEER_ADDRESS   pAddress,
    OUT    ULONGLONG *     pullConnectionId);
HRESULT WINAPI PeerGraphClose(
    IN     HGRAPH          hGraph);
HRESULT WINAPI PeerGraphDelete(
    IN     PCWSTR          pwzGraphId,
    IN     PCWSTR          pwzPeerId,
    IN     PCWSTR          pwzDatabaseName);
HRESULT WINAPI PeerGraphGetStatus(
    IN     HGRAPH          hGraph,
    OUT    DWORD           * pdwStatus);
HRESULT WINAPI PeerGraphGetProperties(
    IN     HGRAPH          hGraph,
    OUT    PPEER_GRAPH_PROPERTIES * ppGraphProperties);
HRESULT WINAPI PeerGraphSetProperties(
    IN     HGRAPH          hGraph,
    IN     PPEER_GRAPH_PROPERTIES pGraphProperties);
// Eventing interfaces
HRESULT WINAPI PeerGraphRegisterEvent(
    IN     HGRAPH          hGraph,
    IN     HANDLE          hEvent,
    IN     ULONG           cEventRegistrations,
    IN     PPEER_GRAPH_EVENT_REGISTRATION pEventRegistrations,
    OUT    HPEEREVENT *    phPeerEvent);
HRESULT WINAPI PeerGraphUnregisterEvent(
    IN     HPEEREVENT      hPeerEvent);
HRESULT WINAPI PeerGraphGetEventData(
    IN     HPEEREVENT      hPeerEvent,
    OUT    PPEER_GRAPH_EVENT_DATA * ppEventData);
// Data Storage
HRESULT WINAPI PeerGraphGetRecord(
    IN     HGRAPH          hGraph,
    IN     GUID *          pRecordId,
    OUT    PPEER_RECORD *  ppRecord);
```

```
HRESULT WINAPI PeerGraphAddRecord(
    IN      HGRAPH          hGraph,
    IN      PPEER_RECORD    pRecord,
    OUT     GUID *          pRecordId);
HRESULT WINAPI PeerGraphUpdateRecord(
    IN      HGRAPH          hGraph,
    IN      PPEER_RECORD    pRecord);
HRESULT WINAPI PeerGraphDeleteRecord(
    IN      HGRAPH          hGraph,
    IN      GUID *          pRecordId,
    IN      BOOL            fLocal);
HRESULT WINAPI PeerGraphEnumRecords(
    IN      HGRAPH          hGraph,
    IN      GUID *          pRecordType,
    IN      PCWSTR          pwzPeerId,
    OUT     HPEERENUM *     phPeerEnum);
HRESULT WINAPI PeerGraphSearchRecords(
    IN      HGRAPH          hGraph,
    IN      PCWSTR          pwzCriteria,
    OUT     HPEERENUM *     phPeerEnum);
HRESULT WINAPI PeerGraphExportDatabase(
    IN      HGRAPH          hGraph,
    IN      PCWSTR          pwzFilePath);
HRESULT WINAPI PeerGraphImportDatabase(
    IN      HGRAPH          hGraph,
    IN      PCWSTR          pwzFilePath);
HRESULT WINAPI PeerGraphValidateDeferredRecords(
    IN      HGRAPH          hGraph,
    IN      ULONG           cRecordIds,
    IN      GUID *          pRecordIds);
// Node/Connection interfaces
HRESULT WINAPI PeerGraphOpenDirectConnection(
    IN      HGRAPH          hGraph,
    IN      PCWSTR          pwzPeerId,
    IN      PPEER_ADDRESS   pAddress,
    OUT     ULONGLONG *     pullConnectionId);
HRESULT WINAPI PeerGraphSendData(
    IN      HGRAPH          hGraph,
    IN      ULONGLONG       ullConnectionId,
    IN      GUID *          pType,
    IN      ULONG           cbData,
    IN      PVOID           pvData);
HRESULT WINAPI PeerGraphCloseDirectConnection(
    IN      HGRAPH          hGraph,
    IN      ULONGLONG       ullConnectionId);
HRESULT WINAPI PeerGraphEnumConnections(
    IN      HGRAPH          hGraph,
    IN      DWORD           dwFlags,        // PEER_CONNECTION_FLAGS
    OUT     HPEERENUM *     phPeerEnum);
HRESULT WINAPI PeerGraphEnumNodes(
    IN      HGRAPH          hGraph,
    IN      PCWSTR          pwzPeerId,
    OUT     HPEERENUM *     phPeerEnum);
HRESULT WINAPI PeerGraphSetPresence(
    IN      HGRAPH          hGraph,
    IN      BOOL            fPresent);
HRESULT WINAPI PeerGraphGetNodeInfo(
    IN      HGRAPH          hGraph,
    IN      ULONGLONG       ullNodeId,
    OUT     PPEER_NODE_INFO * ppNodeInfo);
HRESULT WINAPI PeerGraphSetNodeAttributes(
    IN      HGRAPH          hGraph,
    IN      PCWSTR          pwzAttributes);
HRESULT WINAPI PeerGraphSystemTimeFromGraphTime(
    IN      HGRAPH          hGraph,
    IN      FILETIME *      pftGraphTime,
    OUT     FILETIME *      pftSystemTime);
```

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of providing an interface between an application program and a server process to manage peer-to-peer graphs, comprising the steps of:

receiving from the application program a graph and node information management call having a plurality of call parameters, the graph and node information management call selected from a group consisting of:

a get node information call having the plurality of call parameters comprising a get node graph handle, a node identification of a node about which information is desired, a pointer to a peer node information data structure containing information about the node;

a set node attributes call having the plurality of call parameters comprising a set node graph handle and a string representing attributes to associate with a node to be set;

a get graph properties call having the plurality of call parameters comprising a get graph properties graph handle and a pointer to graph properties;

set graph status call having the plurality of call parameters comprising a group handle and a set of peer graph status flags that are currently set as the status of the group corresponding to the group handle;

a set graph properties call having the plurality of call parameters comprising a set graph properties graph handle and a pointer to a graph properties data structure; and a convert system from graph time call having the plurality of call parameters comprising a convert time graph handle, a pointer to a graph time to be converted, and a pointer to a local system time derived from the graph time;

parsing the graph and node information management call to retrieve the plurality of call parameters; and returning to the application program a value indicative of the success/failure of the graph and node information management call.

2. A method of providing an interface between an application program and a server process to manage peer-to-peer graphs, comprising the steps of:

receiving from the application program a record management call having a plurality of call parameters, the record management call selected from the group consisting of:

an add record call having the plurality of call parameters comprising an add record graph handle, a pointer to record data, and a pointer to a record identification that uniquely identifies a record in a graph;

an update record call having the plurality of call parameters comprising an update record graph handle and a pointer to new data to associate with a record to update;

a delete record call having a plurality of call parameters comprising a delete record graph handle, a pointer to a record identification of a record to delete, and an indication of whether the record to delete is in a local database;

a get record call having the plurality of call parameters comprising a get record graph handle, a pointer to a record identification of a record to retrieve, and a pointer to the retrieved record;

an enumerate records call having the plurality of call parameters comprising an enumerate records graph handle, a pointer to a type of record over which to iterate, a pointer to a peer identification for which records are to be iterated, and a handle to the iteration;

a search records call having a plurality of call parameters comprising a search records graph handle, an XML string describing a query, and an enumeration handle; and a validate deferred records call having the plurality of call parameters comprising a validate deferred records graph handle, a count of records in an array of record identifications that should be re-validated, and the array of record identifications that should be re-validated;

parsing the record management call to retrieve the plurality of call parameters; and returning to the application program a value indicative of the success/failure of the record management call.

3. A method of providing an interface between an application program and a server process to manage peer-to-peer graphs, comprising the steps of:

receiving from the application program a graph utility function call having a plurality of call parameters, the graph utility function call selected from a group consisting of:

a get next item call having the plurality of call parameters comprising an enumeration handle a count of a number of items to read and a pointer to an array of items to be read;

an end enumeration call having the plurality of call parameters comprising a handle to an enumeration to cleanup;

a get item count call having the plurality of call parameters comprising a graph handle and a count of a number of records in an enumeration; and a free data call having the plurality of call parameters comprising a pointer to an item to be freed;

parsing the graph utility function call to retrieve the plurality of call parameters; and returning to the application program a value indicative of the success/failure of the graph utility function call.

4. A method of providing an interface between an application program and a server process to manage peer-to-peer graphs, comprising the steps of:

receiving from the application program a graph direct communication management call having a plurality of call parameters, the graph direct communication management call selected from a group consisting of:

an open direct connection call having the plurality of call parameters comprising a open direct connection graph handle, an unique identification of a person to whom to connect at a given address, a pointer to a structure containing details about the person to whom to connect, and a connection identification of the direct connection;

a close direct connection call having the plurality of call parameters comprising a close direct connection graph handle, and an identification of a neighbor from whom to disconnect;

a send data call having the plurality of call parameters comprising a send data graph handle, a unique identifier for the connection on which to send data, an application defined type of data to be sent, a count of bytes of the data, and the data to send to a receiving neighbor; and an enumerate connections call having the plurality of call parameters comprising an enumerate connections graph handle, a type of connection to enumerate, and a pointer to an enumeration of the connections;

parsing the graph direct communication management call to retrieve the plurality of call parameters; and returning to the application program a value indicative of the success/failure of the graph direct communication management call.

5. A method of providing an interface between an application program and a server process to manage peer-to-peer graphs, comprising the steps of:

receiving from the application program an events infrastructure management call having a plurality of call parameters, the events infrastructure management call selected from a group consisting of:

a register event call having the plurality of call parameters comprising a register event graph handle, an event handle to be signaled on a new event, a count of peer event registration structures, an array of peer event registration structures containing data about notifications being requested, a pointer to a peer event handle that can be used in a call to un-register a notification;

an un-register event call the plurality of call parameters comprising a peer event handle of the event to un-register; and a get event data call having the plurality of call parameters comprising a get peer event handle, and a pointer to event data;

parsing the events infrastructure management call to retrieve the plurality of call parameters; and returning to the application program a value indicative of the success/failure of the events infrastructure management call.

6. A computer-readable storage medium tangibly embodying a program of instruction executable by a computer for performing steps to provide an interface for managing peer-to-peer graphs, comprising:

receiving from the application program a graph management call having a plurality of call parameters, the graph management call selected from the group consisting of:

a graph create call having the plurality of call parameters comprising properties of a graph, a name of a database to associate with the graph at a time of creation, information about a security provider for the graph, and a handle to the graph to be created;

a graph open call having the plurality of call parameters comprising a first unique identifier of a graph to be opened, a second unique identifier for a person opening the graph, information about a security provider for the graph, a count of record types in an array, the array of record types indicating an order in which records are to be synchronized, and a handle to the graph to be opened;

a graph listen call having the plurality of call parameters comprising a handle to a graph on which to listen, an IPv6 scope on which to listen, an IPv6 scope identifier on which to listen, and a port on which to listen;

a graph connect call having the plurality of call parameters comprising a handle of a graph to which to connect, a unique identification of a person to whom to connect at an IP address, a pointer to a data structure containing information about the person, and a pointer to a connection identification;

a graph close call having the plurality of call parameters comprising a handle to a graph from which to disconnect; and a graph delete call having the plurality of call parameters comprising a name of a graph from which to delete data, a peer identification from which to delete the data, and a name of a database associated with a graph to delete;

parsing the graph management call to retrieve the plurality of call parameters; and returning to the application program a value indicative of the success/failure of the graph management call.

7. A computer-readable storage medium tangibly embodying a program of instruction executable by a computer for performing steps to provide an interface for managing peer-to-peer graphs, comprising:

receiving from the application program a graph and node information management call having a plurality of call parameters, the graph and node information management call selected from a group consisting of:

a get node information call having the plurality of call parameters comprising a get node graph handle, a node identification of a node about which information is desired, and a pointer to a peer node information data structure containing information about the node;

a set node attributes call having the plurality of call parameters comprising a set node graph handle and a string representing attributes to associate with the node;

a get graph properties call having the plurality of call parameters comprising a get graph properties graph handle, and a pointer to the graph properties;

a get graph status call having the plurality of call parameters comprising a group handle, a set of peer graph status flags that are currently set as the status of a group corresponding to the group handle;

a set graph properties call having a plurality of call parameters comprising a set graph properties graph handle, and a pointer to a graph properties data structure; and a convert system from graph time call having a plurality of call parameters comprising a convert from graph time graph handle, a pointer to the graph time to be converted, and a pointer to the local system time derived from the graph time;

parsing the graph and node information management call to retrieve the plurality of call parameters; and returning to the application program a value indicative of the success/failure of the graph and node information management call.

8. A computer-readable storage medium tangibly embodying a program of instruction executable by a computer for performing steps to provide an interface for managing peer-to-peer graphs, comprising:

receiving from the application program a record management call having a plurality of call parameters, the record management call selected from a group consisting of:

an add record call having the plurality of call parameters comprising an add record graph handle, a pointer to record data, and a pointer to a record identification that uniquely identifies a record in a graph;

an update record call having the plurality of call parameters comprising an update record graph handle and a pointer to new data to associate with a record to update;

a delete record call having the plurality of call parameters comprising a delete record graph handle, a pointer to a record identification of a record to delete, and an indication of whether the record to delete is in a local database;

a get record call having the plurality of call parameters comprising a get record graph handle, a pointer to a record identification of a record to retrieve, and a pointer to the retrieved record;

an enumerate records call having the plurality of call parameters comprising an enumerate records graph handle, a pointer to a type of record over which to iterate, a pointer to a peer identification for which records are to be iterated, and a handle to the iteration;

a search records call having the plurality of call parameters comprising a search records graph handle, an XML string describing a query, and an enumeration handle;

a validate deferred records call having the plurality of call parameters comprising a validate deferred records graph handle, a count of records in an array of record identifications that should be re-validated, and the array of record identifications that should be re-validated;

parsing the record management call to retrieve the plurality of call parameters; and returning to the application program a value indicative of the success/failure of the record management call.

9. A computer-readable storage medium tangibly embodying a program of instruction executable by a computer for performing steps to provide an interface for managing peer-to-peer graphs, comprising:

receiving from the application program a graph direct communication management call having a plurality of call parameters, the graph direct communication management call selected from a group consisting of:

an open direct connection call having the plurality of call parameters comprising an open direct connection graph handle, an unique identification of a person to whom to connect at a given address, a pointer to a structure containing details about the person to whom to connect, and a connection identification of the direct connection;

a close direct connection call having the plurality of call parameters comprising a close direct connection graph handle and an identification of a neighbor from whom to disconnect:

a send data call having the plurality of call parameters comprising a send data call graph handle, a unique identifier for the connection on which to send data, an application defined type of data to be sent, a count of bytes of the data, and the data to send to the neighbor; and an enumerate connections call having the plurality of call parameters comprising an enumerate connections graph handle, a type of connection to enumerate, and a pointer to an enumeration of the connections;

parsing the graph direct communication management call to retrieve the plurality of call parameters; and returning to the application program a value indicative of the success/failure of the graph direct communication management call.

10. A computer-readable storage medium tangibly embodying a program of instruction executable by a computer for performing steps to provide an interface for managing peer-to-peer graphs, comprising:

receiving from the application program an events infrastructure management call having a plurality of call parameters, the events infrastructure management call selected from a group consisting of:

a register event call having the plurality of call parameters comprising a register event graph handle, an event handle to be signaled on a new event, a count of peer event registration structures, an array of peer event registration structures containing data about notifications being requested, a pointer to a peer event handle that can be used in a call to un-register a notification;

un-register event call having the plurality of call parameters comprising an un-register peer event handle of the event to un-register; and a get event data call having the plurality of call parameters comprising a get peer event handle, and a pointer to event data;

parsing the events infrastructure management call to retrieve the plurality of call parameters; and returning to the application program a value indicative of the success/failure of the events infrastructure management call.

* * * * *